UNITED STATES PATENT OFFICE.

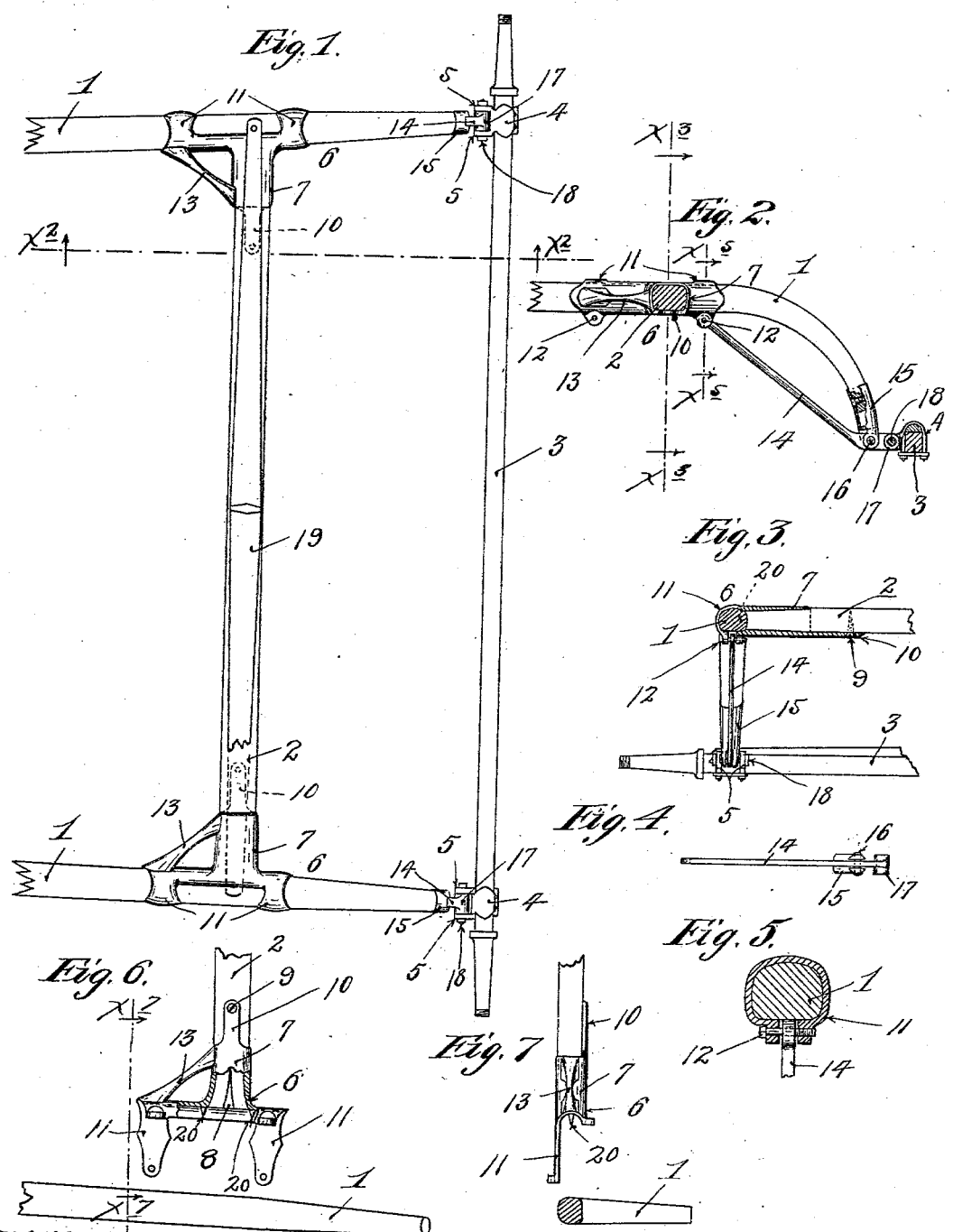

WILLIAM H. SCHULTZ, OF MINNEAPOLIS, MINNESOTA.

VEHICLE-THILL.

SPECIFICATION forming part of Letters Patent No. 715,303, dated December 9, 1902.

Application filed June 26, 1902. Serial No. 113,222. (No model.)

*To all whom it may concern:*

Be it known that I, WILLIAM H. SCHULTZ, a citizen of the United States, residing at Minneapolis, in the county of Hennepin and State of Minnesota, have invented certain new and useful Improvements in Thills; and I do hereby declare the following to be a full, clear, and exact description of the invention, such as will enable others skilled in the art to which it appertains to make and use the same.

My invention relates to thills or shafts for vehicles; and to this end it consists of the novel devices and combinations of devices hereinafter described, and defined in the claim.

The invention is illustrated in the accompanying drawings, wherein like characters indicate like parts throughout the several views.

Figure 1 is a plan view, with some parts broken away, showing a pair of thills involving my invention and an axle of a vehicle to which the thills are connected. Fig. 2 is a vertical section on the line $x^2 \, x^2$ of Fig. 1. Fig. 3 is a transverse section on the line $x^3 \, x^3$ of Fig. 2, some parts being broken away. Fig. 4 is a bottom plan view of one of the so-called "tension" bars or rods. Fig. 5 is a section on the line $x^5 \, x^5$ of Fig. 2. Fig. 6 is a plan view, with some parts broken away, showing one of the shafts of the thill removed from the coöperating coupling-brackets; and Fig. 7 is a section on the line $x^7 \, x^7$ of Fig. 6.

The numeral 1 indicates the shafts, and the numeral 2 the cross-bar, of a pair of thills. The numeral 3 indicates the front axle of a carriage or other vehicle.

The numeral 4 indicates the axle-clips, provided, as is usual, with laterally-spaced ears 5, to which the thills are detachably connected.

In accordance with my invention the shafts 1 are connected to the ends of the cross-bar 2 by angle-brackets 6, provided with sockets 7, into which the ends of the said bar 2 are driven. The sockets 7 taper outward with respect to the ends of the bar 2. Wedges 8 are driven into the ends of the cross-bar 2 to split and spread the same, as shown in Fig. 6. Screws 9, as shown, passed through projections 10 of the sockets 7, securely hold the coupling-brackets 6 against sliding movements. The brackets 6 at the outer ends of the sockets 7 are of channel form and closely fit the inner sides of the shafts 1, and these channel-sections are provided at their ends with clamping-prongs 11, which are adapted to be bent around the outer portions of the shafts and tightly drawn together and onto said shafts by threaded bolts 12, located beneath the said shafts, as best shown in Fig. 5. Struts 13, cast integral with the brackets 6, connect the outer ends of the sockets 7 with the forwardly-projecting ends of the channel-sections of the brackets, and thus greatly increase the ability of the same to withstand lateral strains on the shafts. The brackets 6 are preferably of malleable iron, which material adapts the prongs 11 to be bent around the shafts.

The forward ends of tension rods or bars 14 are connected to the brackets 6 and to the downwardly-curved rear ends of the shafts 1. Preferably said tension-rods 14 are perforated at their forward ends and the rear bolts 12 are passed therethrough, as best shown in Figs. 2 and 5. To the downturned rear ends of the shafts are rigidly connected metal sockets 15, the lower ends of which are bifurcated to embrace the rear ends of the tension-bars 14 and are connected thereto by small bolts 16, passed through said parts. The rear ends of the tension rods or bars 14 project beyond the sockets 15 and are expanded to form sleeve-like heads 17, through which and the ears 5 of the axle-clips 4 bolts 18 are passed to pivotally and detachably connect the thills to the axles.

The numeral 19 indicates an ordinary whiffletree, which is pivotally connected to the top of the cross-bar 2 of the thills in the ordinary way.

Thills as hitherto constructed have been frequently broken or twisted out of shape at the junctions between the shafts and the cross-bar, and, furthermore, the curved rear ends of the shafts have been frequently pulled out of shape and broken because of the fact that the line of draft strain is across the arc of the said curved portions. In other words, the draft strain in the thills always tends to straighten the curved ends thereof, and backing strains act with great leverage, tending to bend or buckle the curved rear ends of the thills. The so-called "tension-rods" 14 employed in accordance with my invention truss and brace the ends of the shafts, and, furthermore, both draft and backing strains are directly transmitted therethrough. In this way the strength and durability of the thills are greatly increased. The coupling-brackets 6 greatly strengthen the thills and make the same rigid against such strains as would be applied to the joints, for instance, by lifting upward on the forward end of one of the shafts and forcing downward the forward end of the other shaft. To hold the brackets 6 against sliding movements on the shafts 1, the channel portions of the same are provided with brads or pointed projections 20, which become embedded in the said shafts.

From what has been said it will be understood that the devices above described are capable of many modifications within the scope of my invention as herein set forth and claimed.

What I claim, and desire to secure by Letters Patent of the United States, is as follows:

The combination with a pair of thills, the shafts of which are downwardly curved at their rear ends and are provided at said ends with metal sockets or caps 15, of coupling-brackets 6 uniting the shafts to the cross-bar and embracing said cross-bar shafts of the thill, and the tension-rods 14 connected to said brackets 6 and sockets 15, to brace the curved portions of the shafts, and provided with the rear ends which project beyond the shafts and are adapted to be coupled to the front axle of the vehicle, substantially as described.

In testimony whereof I affix my signature in presence of two witnesses.

WILLIAM H. SCHULTZ.

Witnesses:
ELIZABETH H. KELIHER,
H. D. KILGORE.